US008297967B2

(12) United States Patent
Huang

(10) Patent No.: US 8,297,967 B2
(45) Date of Patent: Oct. 30, 2012

(54) EJECTOR DEVICE FOR AN INJECTION MOLDING MACHINE

(75) Inventor: Shou-Jen Huang, Sanchung (TW)

(73) Assignee: Acumen Co., Ltd., Sanchung, Taipei Hsien (TW)

( * ) Notice: Subject to any disclaimer, the term of this patent is extended or adjusted under 35 U.S.C. 154(b) by 416 days.

(21) Appl. No.: 12/724,503

(22) Filed: Mar. 16, 2010

(65) Prior Publication Data
US 2011/0229596 A1 Sep. 22, 2011

(51) Int. Cl.
*B29C 45/40* (2006.01)
(52) U.S. Cl. ................ 425/556; 425/441; 425/443
(58) Field of Classification Search .......... 425/116, 425/117, 130, 441, 443, 444, 556, 572, 574, 425/577
See application file for complete search history.

(56) References Cited

U.S. PATENT DOCUMENTS

| 3,158,905 | A | * | 12/1964 | Havlik ........................ 425/548 |
| 3,702,750 | A | * | 11/1972 | Veneria ........................ 425/130 |
| 4,865,536 | A | * | 9/1989 | Inaba et al. .................... 425/556 |
| 4,891,002 | A | * | 1/1990 | Inaba et al. .................... 425/556 |
| 5,196,213 | A | * | 3/1993 | Watanabe et al. ............. 425/556 |
| 5,370,524 | A | * | 12/1994 | Liang et al. .................... 425/556 |
| 5,648,103 | A | * | 7/1997 | Takanohashi ................. 425/107 |
| 5,736,079 | A | * | 4/1998 | Kamiguchi et al. ......... 264/40.1 |
| 6,042,363 | A | * | 3/2000 | Kikuchi ........................ 425/556 |
| 6,051,176 | A | * | 4/2000 | Boucherie .................... 264/250 |
| 6,241,931 | B1 | * | 6/2001 | Ciccone et al. .............. 264/318 |
| 6,478,571 | B1 | * | 11/2002 | Tsai et al. ..................... 425/556 |
| 6,796,787 | B2 | * | 9/2004 | Okada .......................... 425/554 |
| 7,704,063 | B2 | * | 4/2010 | Petrucci et al. .............. 425/139 |
| 2003/0170339 | A1 | * | 9/2003 | Ebner et al. .................. 425/556 |

* cited by examiner

*Primary Examiner* — Yogendra Gupta
*Assistant Examiner* — Emmanuel S Luk
(74) *Attorney, Agent, or Firm* — Alan Kamrath; Kamrath IP Lawfirm, PA

(57) ABSTRACT

An ejector device is mounted in an injection molding machine and has a base, a driving assembly mounted through the base and a hydraulic cylinder and a transmission assembly driving the driving assembly. The driving assembly is further connected to a rotating die of a die assembly and moves reciprocatorily and rotates the rotating die to displace a semi-manufactured plastic article from one set of die faces to another set of die faces to form another plastic layer. Thus, a plastic article with multiple layers or multiple colors is formed in one injection molding machine.

8 Claims, 5 Drawing Sheets

EJECTOR DEVICE FOR AN INJECTION MOLDING MACHINE

BACKGROUND OF THE INVENTION

1. Field of the Invention

The present invention relates to an ejector device for an injection molding machine, especially to an ejector device that allows the injection molding machine to form a plastic article with multiple-layers or multiple-colors or both.

2. Description of the Prior Art(s)

Injection molding machines melt plastic and inject such molten plastic into a die to form a solid plastic article. Generally, a conventional injection molding machine has an injector and a die assembly and performs a certain injection molding process. Therefore, to form a plastic article with multiple layers (the layers may be differentiated by type of plastic, additives, colorants, plasticizers, a combination thereof or the like) requires multiple conventional injection molding machines to operate sequentially. However, moving semi-manufactured articles from one conventional injection molding machine to another is troublesome and time consuming.

To overcome the shortcomings, the present invention provides an ejector device for an injection molding machine to mitigate or obviate the aforementioned problems.

SUMMARY OF THE INVENTION

The main objective of the present invention is to provide an ejector device for an injection molding machine.

The ejector device is mounted in the injection molding machine and has a base, a driving assembly mounted through the base and a hydraulic cylinder and a transmission assembly driving the driving assembly.

The driving assembly is further connected to a rotating die of a die assembly and moves reciprocatorily and rotates the rotating die to displace a semi-manufactured plastic article from one set of die faces to another set of die faces to form another plastic layer. Thus, a plastic article with multiple layers or multi-multiple colors is formed in one injection molding machine.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
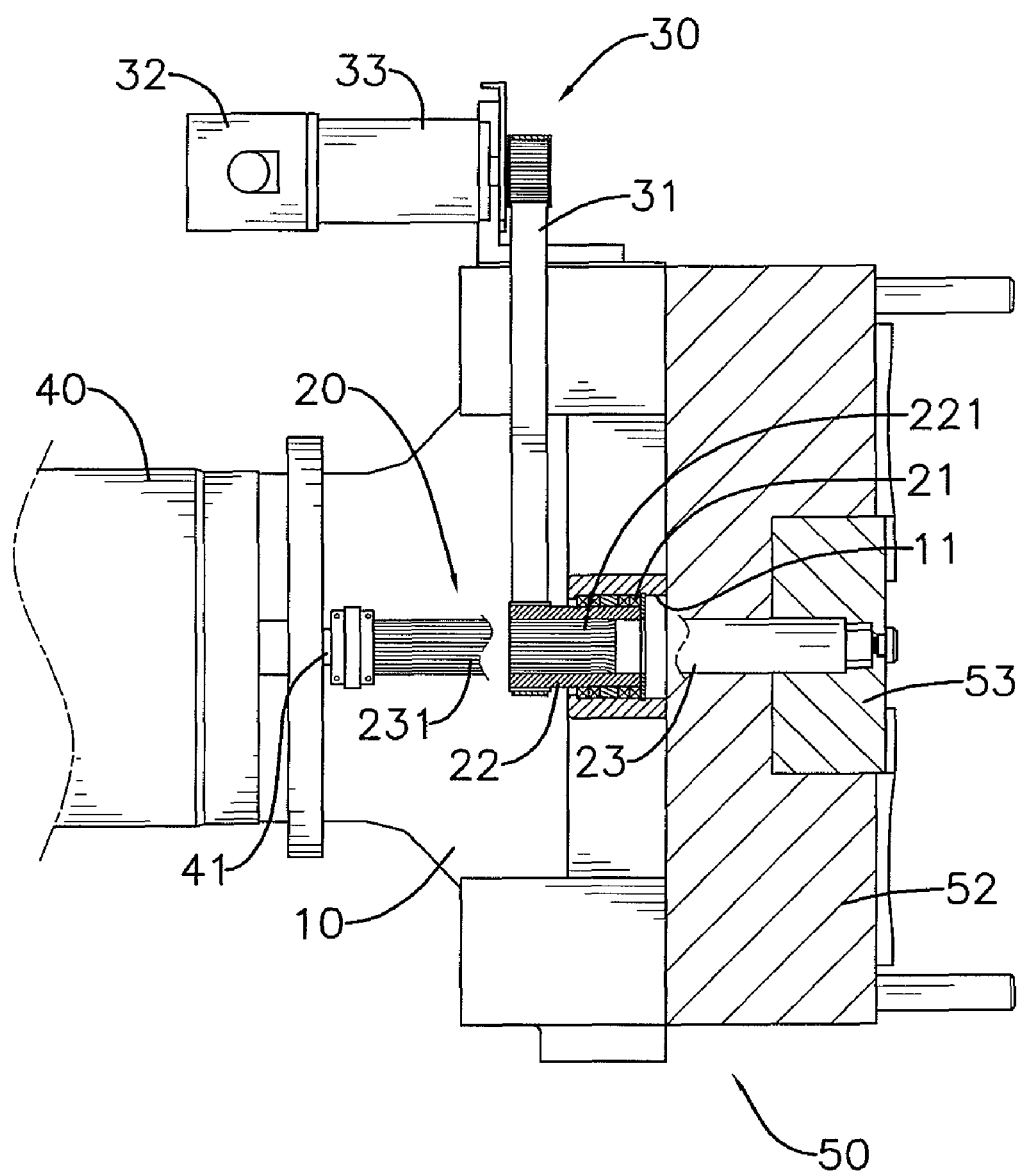
FIG. 1 is a side view in partial section of an ejector device for an injection molding machine in accordance with the present invention, shown connected to a die assembly.
Figure 5:
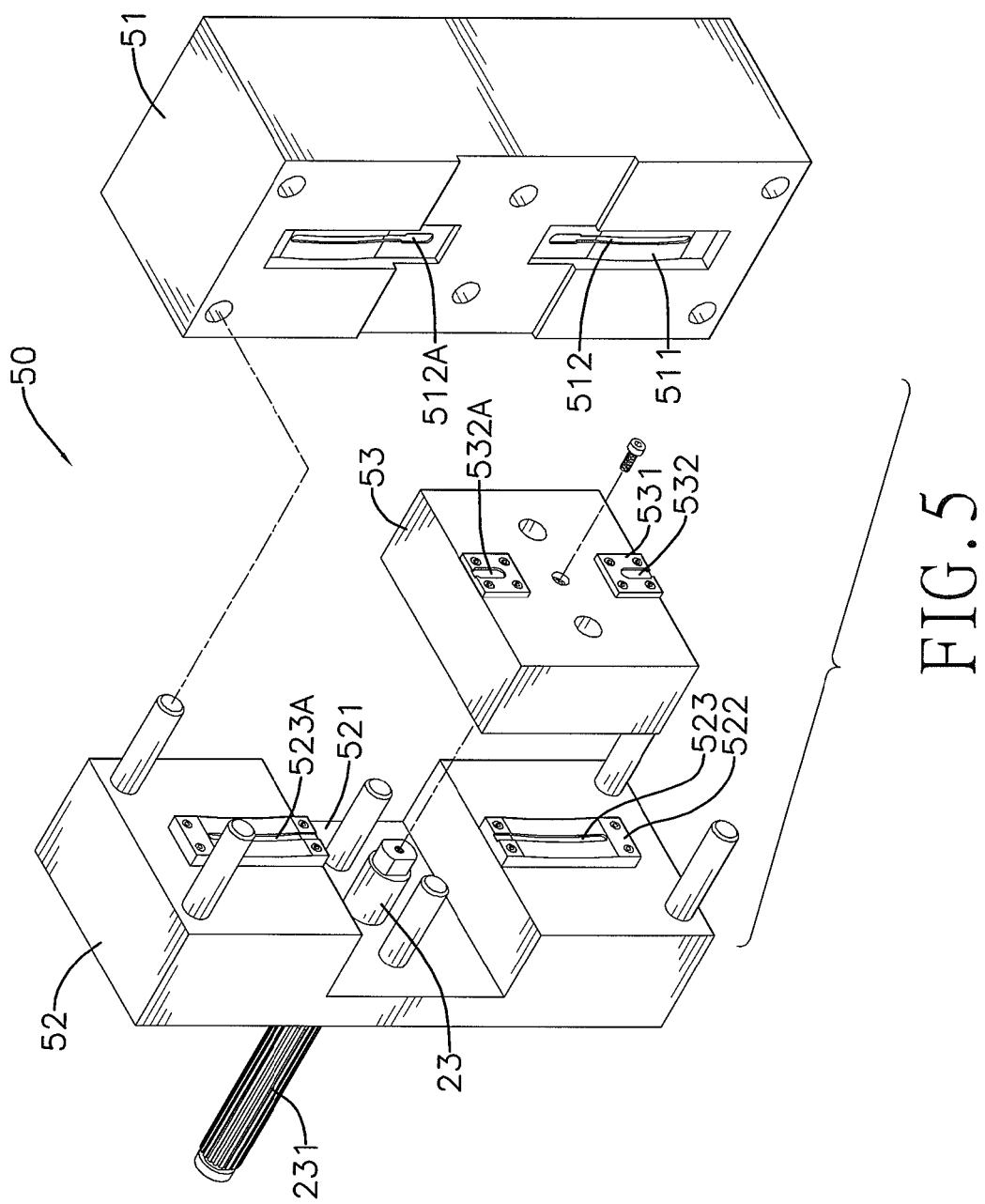
FIG. 5 is an exploded perspective view of the die assembly in FIG. 4.

With reference to FIGS. 1 and 5, an ejector device for an injection molding machine in accordance with the present invention is mounted in the injection molding machine, is connected to a die assembly (50) of the injection molding machine and comprises a base (10), a hydraulic cylinder (40), a driving assembly (20) and a transmission assembly (30).

The base (10) is securely mounted in the injection molding machine and has a pivot hole (11) and an inner surface. The pivot hole (11) is formed through the base (10). The inner surface of the base (10) is defined around the pivot hole (11).

The hydraulic cylinder (40) is mounted in the injection molding machine beside the base (10) and has a driving rod (41) protruding out from the hydraulic cylinder (40) and toward the base (10).

Figure 2:
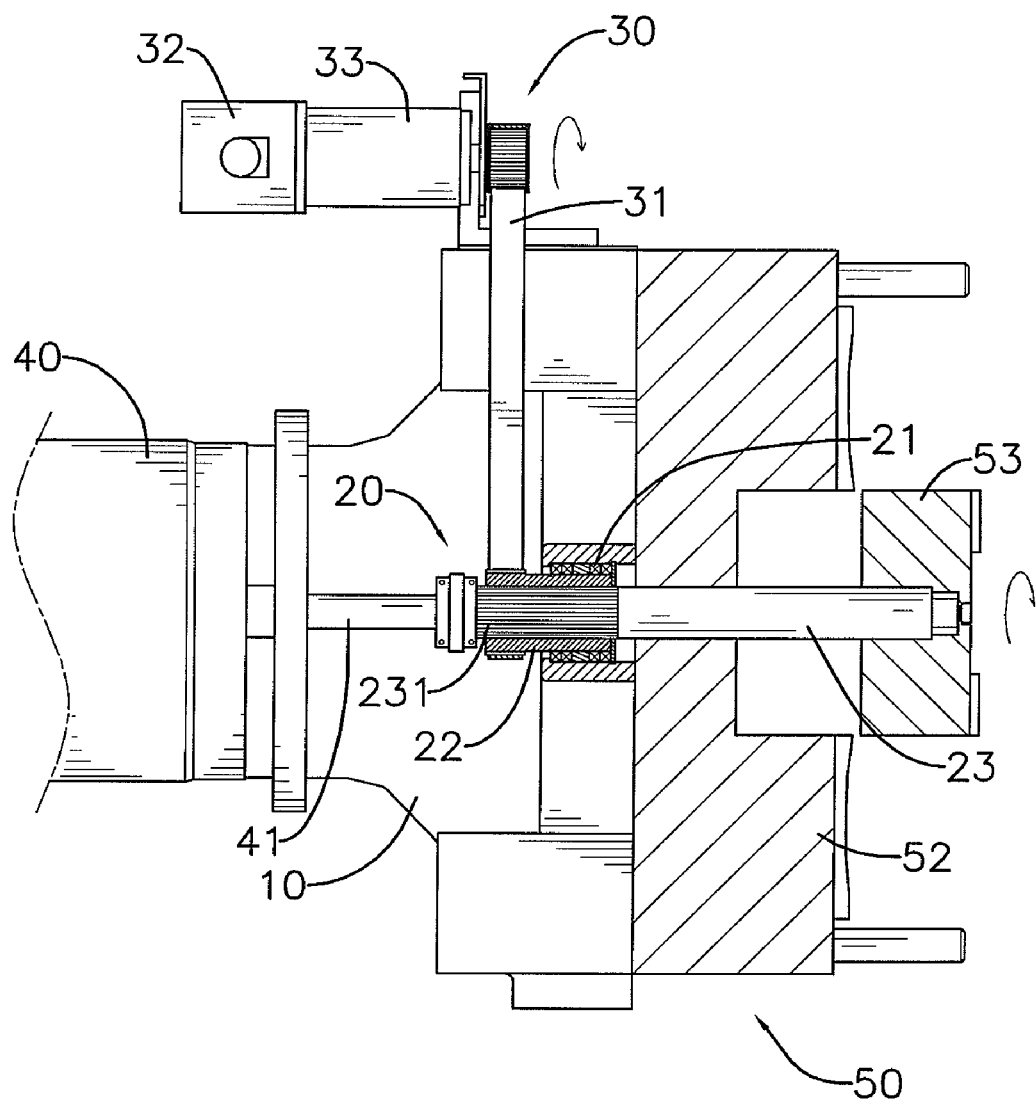
FIG. 2 is an operational side view in partial section of the ejector device in FIG. 1, shown connected to the die assembly.

With further reference to FIG. 2, the driving assembly (20) is mounted in the pivot hole (11) of the base (10) and has at least one bearing (21), a rotating bushing (22) and a driven rod (23).

The at least one bearing (21) is securely mounted in the pivot hole (11) of the base (10). Each of the at least one bearing (21) has an outer ring and an inner ring. The outer ring of the at least one bearing (21) is attached to the inner surface of the base (10).

Figure 3:
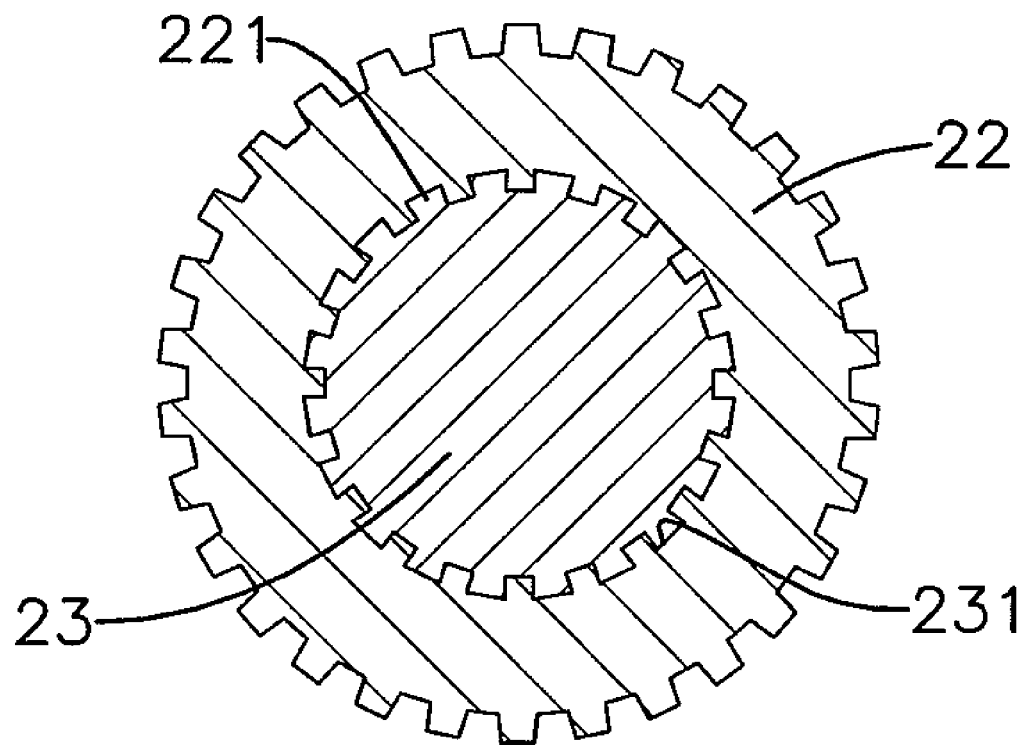
FIG. 3 is enlarged cross-sectional end view of a rotating bushing and a driven rod of the ejector device in FIG. 1.

With further reference to FIG. 3, the rotating bushing (22) is rotatably mounted in the pivot hole (11) of the base (10), may be attached to the inner ring of the at least one bearing (21) and has an inner connecting part (221). The inner connecting part (221) is formed on and around an inner surface of the rotating bushing (22) and may have teeth in cross-section.

The driven rod (23) is mounted through the rotating bushing (22), is rotatably connected to the driving rod (41) of the hydraulic cylinder (40) so the hydraulic cylinder (40) pushes the driven rod (23) forward and backward and has an outer connecting part (231). The outer connecting part (231) is formed on and around an outer surface of the driven rod (23), is connected to the inner connecting part (221) of the rotating bushing (22) and may have teeth in cross-section and engage the inner connecting part (221) of the rotating bushing (22).

The transmission assembly (30) is mounted on the base (10) and has a servo motor (32), a decelerator (33) and a transmission belt (31). The servo motor (32) is mounted on the base (10). The decelerator (33) is connected to the servo motor (32) and reduces an output speed of the servo motor (32). The transmission belt (31) is mounted around and is connected to the rotating bushing (22) of the driving assembly (20) and is connected to and driven by the servo motor (32). Furthermore, the transmission belt (31) may be a timing belt, may engage the rotating bushing (22) and may be connected to the servo motor (32) through the decelerator (33).

Figure 4:
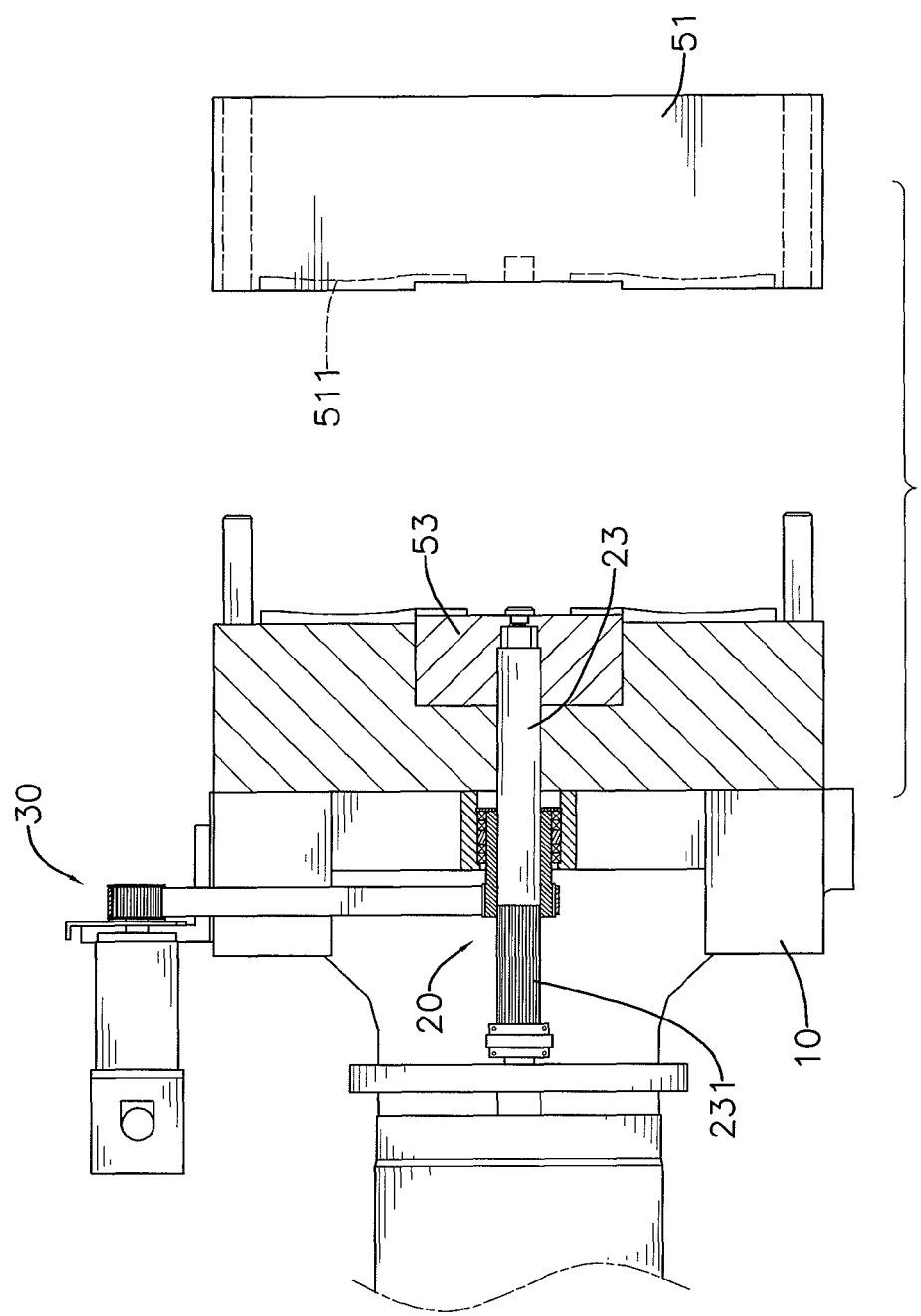
FIG. 4 is an operational side view in partial section of the injection molding machine.

With further reference to FIGS. 4 and 5, the die assembly (50) has a stationary die (51), a moving die (52) and a rotating die (53).

The stationary die (51) is securely mounted in the injection molding machine and has two positioning recesses (511), a first die face (512) and a second die face (512A). The positioning recesses (511) are formed in the stationary die (51) and positioned at 180 degrees relative to each other. The die faces (512, 512A) of the stationary die (51) are respectively formed in the stationary die (51) in the positioning recesses (511).

The moving die (52) is securely mounted to the base (10), corresponds to the stationary die (51) and has two first positioning protrusions (522), a first die face (523), a second die face (523A) and a mounting recess (521). The first positioning protrusions (522) are formed on the moving die (52) and respectively align with the positioning recesses (511) of the stationary die (51). The die faces (523, 523A) of the moving die (52) are respectively formed in the first positioning protrusions (522) of the moving die (52). The mounting recess (521) is formed in the moving die (52) between the first positioning protrusions (522).

The rotating die (53) corresponds to and is movably mounted in the mounting recess (521) of the moving die (52) and has two second positioning protrusions (531), a first die face (532) and a second die face (532A). The second positioning protrusions (531) are formed on the rotating die (53) and respectively correspond to the first positioning protrusions (522) of the moving die (52) and align with the positioning recesses (511) of the stationary die (51). The die faces (532, 532A) of the rotating die (53) are respectively formed in the second positioning protrusions (531) of the rotating die (53). Each cavity (532, 532A) of the rotating die (53) selectively communicates with a corresponding cavity (523, 523A) of the moving die (52).

The driven rod (23) of the driving assembly (20) is further rotatably mounted through the moving die (52), protrudes through the mounting recess (521) of the moving die (52) and is connected to the rotating die (53) so the driven rod (23) further moves reciprocatorily and rotates the rotating die (53).

With reference to FIG. 1, when the rotating die (53) is mounted in the mounting recess (521) of the moving die (52) and the moving die (52), the rotating die (53) and the ejector device are moved toward the stationary die (51), a corresponding pair of first and second positioning protrusions (522, 523) are mounted in a corresponding positioning recess (511) of the stationary die (51). Thus, the die faces (512, 512A, 523, 523A, 532, 532A) of the stationary die (51), the moving die (52) and the rotating die (53) form a first chamber and a second chamber, the injectors respectively inject plastic materials in the chambers and a semi-manufactured article is formed in the first chamber.

With further reference to FIG. 2, then the ejector device, the moving die (52) and the rotating die (53) are moved away from the stationary die (51). The driven rod (23) of the driving assembly (20) pushes the rotating die (53) along with the semi-manufactured plastic article away from the mounting recess (521) of the moving die (52) and rotates the rotating die (32) by 180 degrees. Afterwards, the driven rod (23) of the driving assembly (20) pulls the rotating die (53) along with the semi-manufactured plastic article back to the mounting recess (521) of the moving die (52). Therefore, part of the semi-manufactured plastic article is disposed in the second cavity (523A) of the moving die (52). Then the moving die (52), the rotating die (53) and the ejector device are moved toward the stationary die (51) again.

Thus, the semi-manufactured plastic article is further disposed in the second die faces (512A, 523A) of the stationary die (51) and the moving die (52) and the first die face (532) of the rotating die (53) to allow another injector to inject another material or color of molten plastic to formed around the semi-manufactured plastic article. Then a plastic article with multiple layers (the layers may be differentiated by type of plastic, additives, colorants, plasticizers, a combination thereof or the like) is completed and is taken away from the rotating die (53). The above mentioned processes is repeated and plastic articles with multiple layers are continuously manufactured.

The ejector device as described has the following advantages. The injection molding machine may have two or more injectors to inject different kinds of molten plastics and form the plastic articles with multiple layers or multiple colors or both in one injection molding machine. Work-load of operators are lightened and space for the injection molding machine is saved.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An ejector device for an injection molding machine comprising
    a base having
        a pivot hole formed through the base; and
        an inner surface defined around the pivot hole;
    a hydraulic cylinder mounted beside the base and having a driving rod protruding out from the hydraulic cylinder and toward the base;
    a driving assembly mounted in the pivot hole of the base and having
        a rotating bushing rotatably mounted in the pivot hole of the base and having an inner connecting part formed on and around an inner surface of the rotating bushing; and
        a driven rod mounted through the rotating bushing, rotatably connected to the driving rod of the hydraulic cylinder and having an outer connecting part formed on and around an outer surface of the driven rod and connected to the inner connecting part of the rotating bushing; and
    a transmission assembly mounted on the base and having
        a servo motor mounted on the base; and
        a transmission belt mounted around and connected to the rotating bushing of the driving assembly and connected to and driven by the servo motor.

2. The ejector device as claimed in claim 1, wherein the driving assembly further has at least one bearing securely mounted in the pivot hole of the base, and each of the at least one bearing having
    an outer ring attached to the inner surface of the base; and
    an inner ring attached to the rotating bushing.

3. The ejector device as claimed in claim 1, wherein
    the transmission assembly further has a decelerator connected to the servo motor; and
    the transmission belt of the transmission assembly is connected to the servo motor through the decelerator.

4. The ejector device as claimed in claim 2, wherein
    the transmission assembly further has a decelerator connected to the servo motor; and
    the transmission belt of the transmission assembly is connected to the servo motor through the decelerator.

5. The ejector device as claimed in claim 3, wherein the transmission belt of the transmission assembly is a timing belt.

6. The ejector device as claimed in claim 4, wherein the transmission belt of the transmission assembly is a timing belt.

7. The ejector device as claimed in claim 5, wherein
    the inner connecting part of the rotating bushing of the driving assembly has teeth in cross-section; and
    the outer connecting part of the driven rod has teeth in cross-section and engages the inner connecting part of the rotating bushing.

8. The ejector device as claimed in claim 6, wherein
    the inner connecting part of the rotating bushing of the driving assembly has teeth in cross-section; and
    the outer connecting part of the driven rod has teeth in cross-section and engages the inner connecting part of the rotating bushing.

* * * * *